US012650975B1

(12) United States Patent
Bender

(10) Patent No.: US 12,650,975 B1
(45) Date of Patent: Jun. 9, 2026

(54) SYSTEMS AND METHODS FOR RESOLVED CONTENT

(71) Applicant: BENDER INNOVATIONS LLC, Las Vegas, NV (US)

(72) Inventor: Zachary Weidler Bender, Wheaton, IL (US)

(73) Assignee: BENDER INNOVATIONS LLC, Las Vegas, NV (US)

( * ) Notice: Subject to any disclaimer, the term of this patent is extended or adjusted under 35 U.S.C. 154(b) by 0 days.

(21) Appl. No.: 19/316,283

(22) Filed: Sep. 2, 2025

(51) Int. Cl.
| | |
|---|---|
| *G06F 16/00* | (2019.01) |
| *G06F 16/23* | (2019.01) |
| *G06F 16/9536* | (2019.01) |
| *G06F 16/9538* | (2019.01) |

(52) U.S. Cl.
CPC ...... *G06F 16/2365* (2019.01); *G06F 16/9536* (2019.01); *G06F 16/9538* (2019.01)

(58) Field of Classification Search
None
See application file for complete search history.

(56) References Cited

U.S. PATENT DOCUMENTS 11,397,923 B1 * 7/2022 Garrity ................. G06F 16/958

FOREIGN PATENT DOCUMENTS

| | | | | |
|---|---|---|---|---|
| AU | 2022405439 A1 * | 7/2024 | ......... | G06F 16/9536 |
| WO | WO-2025080963 A1 * | 4/2025 | ............. | G06N 20/20 |

OTHER PUBLICATIONS

Ormont (CN-104919452-A), "For Improving The Search Using An Image", Sep. 16, 2015, 13 Pages. (Year: 2015).*
McNulty et al. (WO-2024220450-A1), "System, and Method to Curate and Present Content Based on a Person's Biometric Identifier Information", Oct. 24, 2024, 114 Pages. (Year: 2024).*

* cited by examiner

*Primary Examiner* — Bai D Vu
(74) *Attorney, Agent, or Firm* — Nicholas Martin; Greenberg Traurig, LLP

(57) ABSTRACT

Systems and methods are provided for a decision-intelligence (DI)-based, computerized framework for automatically and/or dynamically aggregating verified and/or authenticated content from a plurality of disparately located types of network resources, which can be implemented and/or leveraged for controlling and/or improving the veracity of content shared, posted and/or interacted with online by users, applications, devices, and the like. The framework can implement a multi-layered framework architecture that combines metadata enrichment mechanisms that transform basic identity inputs through integration with authoritative third-party data sources, advanced identity resolution algorithms that employ multi-factor verification strategies including behavioral signature analysis and cross-platform verification scoring, and a modular platform-specific adapter system that can interface with diverse social media APIs. The framework's functionality provides real-time processing capabilities through event-driven architecture that can provide near-instantaneous content updates and verification status changes, coupled with intelligent caching mechanisms that balance responsiveness with API rate limiting requirements.

20 Claims, 6 Drawing Sheets

300

300

302 — Receive input data and query database(s)

304 — Execute identity resolution operations

306 — Retrieve and filter content from network resource(s)

308 — Perform filtering and verification of content

310 — Generate and output verified output

SYSTEMS AND METHODS FOR RESOLVED CONTENT

FIELD OF THE DISCLOSURE

The present disclosure relates to content management and communication, and more particularly, to a decision intelligence (DI)-based computerized framework for automatically and dynamically compiling and/or generating, and communicating aggregated content from a plurality of disparately located types of network resources.

SUMMARY OF THE DISCLOSURE

According to some embodiments, as discussed herein, disclosed are systems and methods that provide a social media content verification and aggregation framework, which as discussed herein, can be implemented and/or leveraged for controlling and/or improving the veracity of content shared, posted and/or interacted with online by users, applications, devices, and the like.

As discussed herein, the disclosed framework provides advanced functionality for accurately, and computationally efficiently, verifying and aggregating social media content across multiple platforms for specific entities, particularly in dynamic domains, such as, for example, sports where entity affiliations, statuses, and verification credentials frequently change. Existing approaches fail to provide reliable and/or accurate identity resolution when dealing with ambiguous user inputs, lack advanced metadata enrichment capabilities that can disambiguate between authentic accounts and impersonators, and cannot effectively maintain content attribution accuracy when entities undergo status changes, such as, for example, team transfers, name changes, or career transitions. Moreover, current solutions are unable to handle the complex technical requirements of interfacing with multiple social media platforms simultaneously while maintaining real-time content processing, cross-platform deduplication, and behavioral pattern analysis for authenticity verification.

To that end, the disclosed framework addresses such technical shortcomings, inter alia, by providing novel mechanisms by implementing a multi-layered framework architecture combining metadata enrichment mechanisms that transform basic identity inputs through integration with authoritative third-party data sources, advanced identity resolution algorithms that employ multi-factor verification strategies including behavioral signature analysis and cross-platform verification scoring, and a modular platform-specific adapter system that can interface with diverse social media application program interfaces (APIs), while normalizing heterogeneous data formats. In some embodiments, the framework's identity resolution component utilizes artificial intelligence/machine learning (AI/ML) algorithms that can continuously improve accuracy through feedback loops and can handle complex scenarios, such as, for example, entity evolution over time while maintaining historical content associations. The content aggregation mechanisms, as discussed herein, can implement advanced fingerprinting algorithms for cross-platform duplicate detection, temporal ordering mechanisms that preserve chronological accuracy regardless of retrieval delays, and intelligent filtering systems that can apply configurable criteria including sentiment analysis and engagement thresholds.

In some embodiments, the framework's novel functionality provides real-time processing capabilities through event-driven architecture that can provide near-instantaneous content updates and verification status changes, coupled with intelligent caching mechanisms that balance responsiveness with API rate limiting requirements. In some embodiments, the framework implements dynamic content modification capabilities that can automatically update content attribution, add verification indicators, and apply contextual enrichment based on changing entity status, while supporting cross-domain applications through domain-specific behavioral pattern recognition and verification algorithms adapted for different industry contexts including sports, fashion, entertainment, and business sectors.

In some embodiments, the comprehensive API architecture supports both RESTful and WebSocket protocols for diverse integration patterns, implements webhook mechanisms for proactive content delivery, and provides advanced notification systems that can generate targeted alerts based on entity changes and verification updates. In some embodiments, the framework's scalability architecture utilizes distributed data storage with both relational SQL and non-relational (NoSQL) databases, implements automatic sharding strategies, and supports containerized application scaling that can automatically provision resources during demand spikes while maintaining consistent performance through intelligent request batching, parallel processing architectures, and multi-layered caching systems.

It should be understood that while the discussion herein may focus on sports entities, including, but not limited to, athletes, players, coaches, teams, team personnel, and the like, it should not be construed as limiting, as one of skill in the art would readily understand the applicability of the disclosed systems and methods to any other type of information, category and/or content type, which can include, but is not limited to, fashion, news, beauty, technology, and the like, or some combination thereof, for example.

According to some embodiments, a method is disclosed for a DI-based computerized framework for automatically and dynamically aggregating verified and/or authenticated content from a plurality of disparately located types of network resources. In accordance with some embodiments, the present disclosure provides a non-transitory computer-readable storage medium for carrying out the above-mentioned technical steps of the framework's functionality. The non-transitory computer-readable storage medium has tangibly stored thereon, or tangibly encoded thereon, computer readable instructions that when executed by a device cause at least one processor to perform a method for automatically and dynamically aggregating verified and/or authenticated content from a plurality of disparately located types of network resources.

In accordance with one or more embodiments, a system is provided that includes one or more processors and/or computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DESCRIPTIONS OF THE DRAWINGS

The features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure:

DETAILED DESCRIPTION

Figure 1:
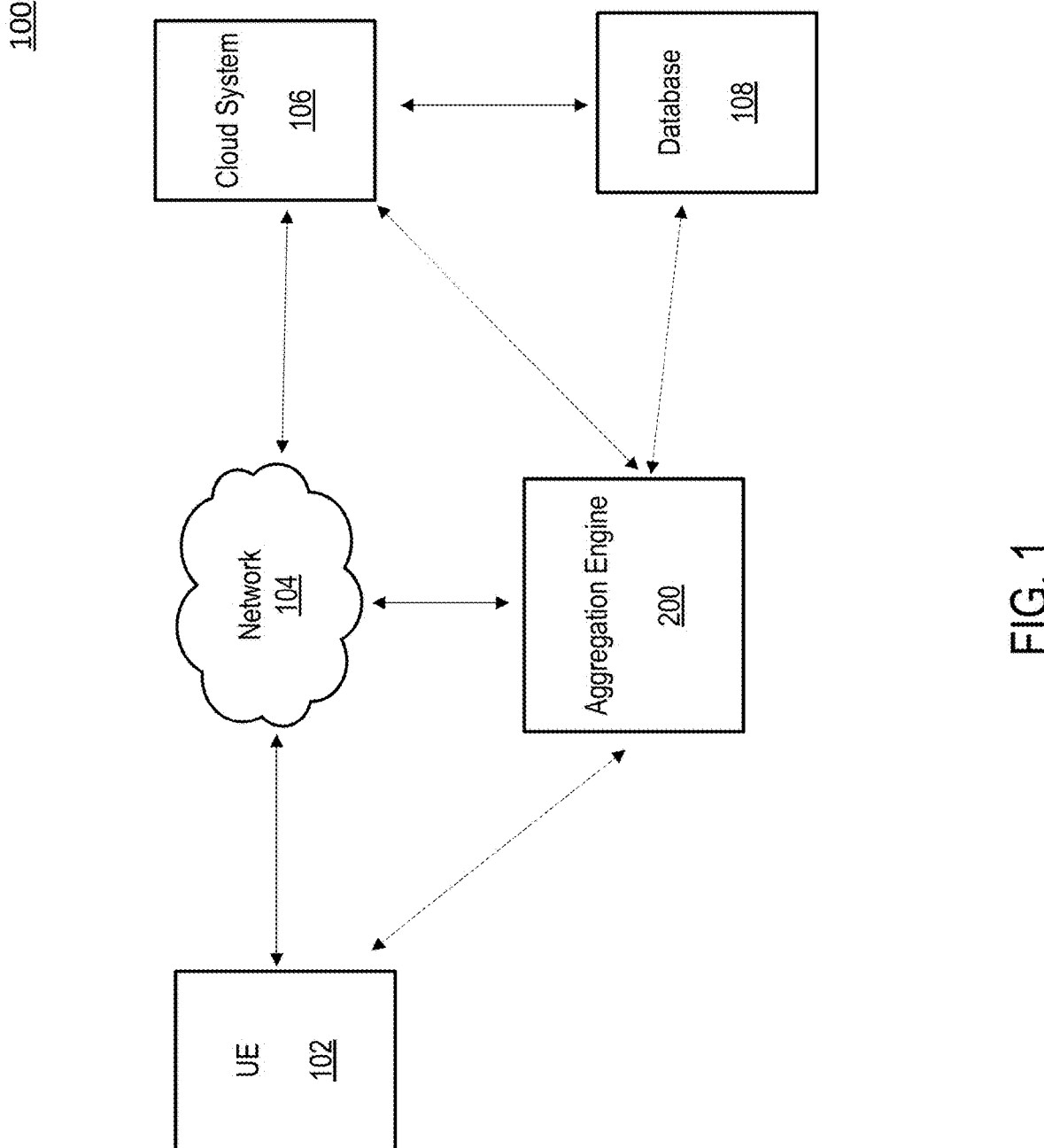
FIG. 1 is a block diagram of an example configuration within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may include computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, optical storage, cloud storage, magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure, a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ different architectures or may be compliant or compatible with different protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router mesh, or 2nd, 3rd, $4^{th}$ or $5^{th}$ generation (2G, 3G, 4G or 5G) cellular technology, mobile edge computing (MEC), Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or user, entity, subscriber or customer) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device a Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

Certain embodiments and principles will be discussed in more detail with reference to the figures. According to some embodiments, as discussed herein, the framework functions to provide a comprehensive, computerized solution for verifying and aggregating social media content associated with specific entities across multiple domains, including but not limited to sports entities, such as, for example, athletes, coaches, team personnel, fashion influencers, entertainment personalities, and corporate executives, for example, for which an output feed can be curated, compiled and sent to requesting and/or identified users. In some embodiments, the framework can implement a multi-layered architecture that combines metadata enrichment mechanisms, identity resolution algorithms, and platform-specific adapter modules to ensure accurate content attribution and verification.

In some embodiments, the framework can utilize a modular approach where each component can operate independently while maintaining seamless integration through standardized interfaces. In some embodiments, the framework can process user identity inputs through a metadata mechanism and/or component that can enrich basic identity information with third-party verification data, sports statistics databases, team rosters, and other authoritative sources. Such enriched metadata can then be processed through identity resolution logic that can determine the correct entity associations and can resolve potential conflicts or ambiguities in identity matching.

In some embodiments, the metadata enrichment functionality can serve as the foundational component that transforms basic user identity inputs into comprehensive entity profiles. In some embodiments, the framework can accept initial identity markers, such as, for example, usernames, display names, biographical information, or preliminary identifiers like "LeBron" and can systematically expand such information through integration with multiple authoritative data sources. Thus, for example, a data item can be created, or data structures created based on the enrichment performed via the disclosed framework. In some embodiments, the enrichment process can begin with lexical analysis of the input identity markers, where the framework can parse textual elements, extract key identifiers, and normalize naming conventions across different formats. In some embodiments, the framework can implement natural language processing algorithms that can identify entity types, disambiguate common names, and extract contextual information that can inform the enrichment process.

In some embodiments, the framework can maintain connections to various third-party metadata sources, including sports databases, such as, for example, ESPN APIs, official league databases, team roster systems, and verified athlete directories. In some embodiments, the enrichment functionality can query these sources using the initial identity inputs and can retrieve comprehensive profile data including full names, team affiliations, position information, career statistics, and historical team changes. For sports entities specifically, the framework can access real-time roster data that can reflect recent trades, signings, or status changes. In some embodiments, the enrichment functionality can cross-reference multiple authoritative sources to ensure data accuracy and can implement conflict resolution algorithms when discrepancies arise between different data sources.

In some embodiments, the framework can maintain a confidence scoring system that can weight different metadata sources based on their reliability and recency. In some embodiments, the enrichment process can extend beyond basic biographical data to include behavioral patterns, posting schedules, common hashtag usage, and social media verification status across platforms. In some embodiments, the framework can analyze historical social media activity patterns to establish baseline behavioral signatures that can inform the identity verification process.

In some embodiments, the framework can include an identity resolution component (or functionality) that can implement advanced algorithms that can process the enriched metadata to determine definitive entity associations. In some embodiments, the resolution logic can be executed that can employ multiple verification strategies that can operate in parallel to maximize accuracy while minimizing false positive associations. In some embodiments, the framework can implement a multi-factor authentication approach where identity resolution can consider various verification signals including platform verification badges, account creation dates, follower patterns, engagement metrics, and content consistency analysis.

In some embodiments, the resolution algorithms can analyze posting patterns to identify behavioral signatures that can distinguish authentic entity accounts from impersonation attempts or fan accounts. In some embodiments, the identity resolution logic can function to maintain dynamic scoring matrices that can evaluate potential matches based on configurable criteria. For example, for sports entities, these criteria can include team affiliation consistency, career timeline alignment, geographic location correlation, and social network connection patterns with verified teammates, coaches, or organizational accounts.

In some embodiments, the framework can implement machine learning algorithms that can continuously improve identity resolution accuracy through feedback loops. In some embodiments, the framework can analyze successful and failed identity matches to refine its scoring algorithms and can adapt to evolving social media patterns and platform changes. The resolution process can handle complex scenarios, such as, for example, name changes due to marriage, trades between teams, or career transitions. In some embodiments, the framework can maintain historical identity mapping that can track entity evolution over time and can preserve content associations even when underlying profile information changes.

In some embodiments, the framework can implement a modular adapter architecture that can interface with multiple social media platforms through standardized protocols while accommodating platform-specific API requirements and data formats. Each adapter can serve as a specialized interface layer that can translate between the framework's internal data structures and the unique requirements of individual social media platforms. For example, the Twitter™ (or X™) adapter can implement OAuth authentication protocols and can interface with Twitter's API v2 endpoints to retrieve tweet data, user profile information, and engagement metrics. In some embodiments, the adapter can handle rate limiting through intelligent request queuing and can implement retry logic for failed requests. The adapter can process Twitter-specific data elements, such as, for example, retweets, quote tweets, and threaded conversations while normalizing such data into the framework's standardized content format.

In another example, the Instagram® adapter can manage Instagram's Graph API authentication requirements and can retrieve posts, stories, and IGTV content associated with verified entities. In some embodiments, the adapter can handle Instagram's content filtering requirements and can process visual content metadata including image recognition data and hashtag analysis. The adapter can also manage Instagram's business account requirements for API access and can maintain appropriate data usage compliance. The Facebook® adapter can interface with Facebook's Graph API to access page posts, user posts, and engagement data while maintaining compliance with Facebook's data access policies. In some embodiments, the adapter can handle Facebook's permission-based access model and can manage token refresh cycles to maintain continuous data access.

In yet another example, the TikTok™ adapter can implement TikTok's API authentication and can retrieve video content, hashtag data, and engagement metrics. In some embodiments, the adapter can process TikTok-specific content elements, such as, for example, video effects, music attribution, and viral trend participation while normalizing such data for the framework's aggregation functionality. The Snapchat adapter can interface with Snapchat's public content APIs where available and can retrieve story content and public profile information. In some embodiments, the adapter can handle Snapchat's ephemeral content model and can capture content within appropriate time windows.

Accordingly, each adapter can implement error handling, retry logic, and failover mechanisms to ensure robust operation even when individual platforms experience outages or API changes. In some embodiments, the framework can maintain adapter health monitoring that can detect platform issues and can route requests to alternative data sources when possible.

In some embodiments, the framework can implement content aggregation functionality that can collect, normalize, and filter social media content from multiple platforms while maintaining content authenticity and eliminating duplicate entries. In some embodiments, the aggregation process can begin with the adapters retrieving raw content data from each platform, which the framework can then process through multiple normalization and filtering stages. The content normalization process can standardize data formats across different platforms, ensuring that posts, images, videos, and engagement metrics can be consistently processed regardless of their origin platform.

In some embodiments, the framework can implement content fingerprinting algorithms that can identify duplicate or cross-posted content across platforms and can maintain canonical versions while preserving platform-specific engagement data. In some embodiments, the framework can apply configurable criteria to determine which content should be included in the aggregated feed. Such criteria can include, but is not limited to, content recency, engagement thresholds, content type preferences, and keyword filtering. In some embodiments, the framework can implement sentiment analysis algorithms that can categorize content based on emotional tone and can filter content based on sentiment requirements.

In some embodiments, the framework can maintain temporal ordering of content across platforms, ensuring that aggregated feeds can present content in chronological order regardless of platform posting times or retrieval delays. In some embodiments, the framework can implement intelligent batching that can optimize content retrieval patterns to minimize API usage while maintaining near real-time content updates.

In some embodiments, the framework can implement multi-layered verification protocols that can ensure content authenticity and can prevent unauthorized content association. The verification process can operate at multiple levels, including account-level verification, content-level authentication, and behavioral pattern analysis. Account-level verification can leverage platform-native verification systems, such as, for example, blue checkmarks, verified badges, and official account designations. In some embodiments, the framework can cross-reference verification status across multiple platforms and can implement weighted verification scoring that can account for varying verification standards across different social media platforms.

In some embodiments, the framework can utilize content-level authentication that can analyze individual posts for authenticity markers, such as, for example, original content indicators, timestamp consistency, and engagement pattern analysis. In some embodiments, the framework can implement algorithms that can detect artificially inflated engagement, bot interactions, and suspicious posting patterns that might indicate compromised or inauthentic accounts. In some embodiments, the framework can maintain behavioral baselines for verified entities that can include typical posting frequency, content themes, language patterns, and engagement ratios. The verification system can flag content that significantly deviates from established behavioral patterns and can require additional verification before including such content in aggregated feeds.

In some embodiments, the framework can implement real-time (or near real-time) verification monitoring that can continuously assess account authenticity and can detect potential account compromises or impersonation attempts. In some embodiments, the framework can automatically quarantine suspicious content pending manual review and can maintain audit trails for all verification decisions.

In some embodiments, the framework can extend beyond sports entities to support content aggregation and verification across multiple domains including fashion, entertainment, business, and technology sectors. Such modular architecture can allow for domain-specific customization while maintaining core functionality across all supported sectors. For example, for fashion industry applications, the framework can integrate with fashion database APIs, designer directories, and brand ambassador lists to verify fashion influencers, designers, and industry professionals. The disclosed metadata enrichment functionality can incorporate fashion-specific data sources, such as, for example, runway show participation, brand partnerships, and industry award databases.

In some embodiments, for example, in entertainment applications, the framework can connect with entertainment industry databases including IMDb, music streaming service APIs, and award show databases to verify actors, musicians, directors, and other entertainment professionals. In some embodiments, the framework can track career milestones, project announcements, and industry recognition to maintain accurate entity profiles. For business and technology applications, the framework can integrate with professional databases, such as, for example, LinkedIn, corporate directories, and industry-specific databases to verify executives, entrepreneurs, and thought leaders. In some embodiments, the framework can track career changes, company affiliations, and professional achievements to maintain accurate business entity profiles.

In some embodiments, the cross-domain capabilities can include domain-specific content filtering that can apply industry-relevant criteria for content inclusion and verification. In some embodiments, the framework can maintain domain-specific behavioral patterns and can adapt verification algorithms to account for industry-specific social media usage patterns.

In some embodiments, the framework can implement real-time processing capabilities that can provide near-instantaneous content updates and verification status changes. In some embodiments, the framework can provide real-time processing functionality that can monitor social media platforms continuously and can detect new content, account changes, and verification status updates as they occur. In some embodiments, the framework can implement event-driven architecture where platform adapters can push new content or analysis immediately upon detection. In some embodiments, the framework can maintain persistent connections to platform APIs where supported and can utilize webhook mechanisms to receive real-time content notifications.

In some embodiments, the framework's update mechanisms can prioritize different types of content based on configurable criteria, such as, for example, entity importance, content engagement levels, and time sensitivity. High-priority entities, such as, for example, major athletes during active seasons can receive preferential processing that can ensure their content appears in aggregated feeds with minimal delay. In some embodiments, the framework can implement intelligent caching mechanisms that can balance real-time responsiveness with API rate limiting requirements. In some embodiments, the framework can maintain content caches with configurable expiration policies and can implement cache invalidation strategies that can ensure content freshness while optimizing API usage.

The real-time processing system can handle traffic spikes during major events, such as, for example, games, tournaments, or industry announcements. In some embodiments, the framework can implement automatic scaling that can provision additional processing resources during high-demand periods and can maintain consistent performance levels.

In some embodiments, the framework can implement a distributed data storage architecture that can efficiently store, index, and retrieve large volumes of social media content while maintaining data integrity and supporting complex query patterns. The storage system can utilize both relational and NoSQL database technologies to optimize different aspects of data management. Entity profile data can be stored in relational databases that can maintain referential integrity and can support complex relationships between entities, teams, organizations, and content. In some embodiments, the framework can implement database sharding strategies that can distribute entity data across multiple database instances to ensure scalability and performance.

Social media content can be stored in document-based NoSQL databases that can accommodate the varying structure of different platform content types. The storage system can maintain content metadata, engagement metrics, and verification status alongside the content itself. In some embodiments, the framework can implement content archiving strategies that can move older content to cost-optimized storage while maintaining accessibility for historical analysis.

The indexing system can create multiple index types optimized for different query patterns including entity-based queries, time-based queries, content-type queries, and engagement-based queries. In some embodiments, the framework can implement full-text search capabilities that can enable keyword-based content discovery across all stored content. The data storage architecture can implement backup and disaster recovery mechanisms that can ensure data preservation and system availability. In some embodiments, the framework can maintain geographically distributed backup systems and can implement automated recovery procedures that can restore service with minimal downtime.

In some embodiments, the framework can provide comprehensive API interfaces that can enable external systems to access verified and aggregated content data. The API architecture can support both RESTful and WebSocket protocols to accommodate different integration patterns and real-time requirements. The REST API can provide endpoints for retrieving entity profiles, aggregated content feeds, verification status, and historical content archives. In some embodiments, the API can support complex query parameters that can enable filtering by entity type, content type, date ranges, engagement metrics, and verification status. The API can implement authentication and authorization mechanisms that can ensure appropriate access control for different types of external integrations.

The WebSocket API can provide real-time content streaming capabilities that can push new content and verification updates to connected clients immediately upon availability. In some embodiments, the framework can support topic-based subscriptions that can allow clients to receive updates for specific entities, content types, or event categories. The framework can implement webhook mechanisms that can push content updates to external systems proactively. These webhooks can be configured with filtering criteria and can deliver targeted content updates to specific external endpoints. In some embodiments, the framework can maintain webhook delivery guarantees and can implement retry logic for failed deliveries.

External connectivity can extend to third-party analytics platforms, content management systems, and marketing automation tools. In some embodiments, the framework can provide pre-built integrations with popular platforms and can support custom integration development through comprehensive SDK offerings.

In some embodiments, the framework can support a wide range of application scenarios that can leverage verified and aggregated social media content. These applications can span multiple industries and use cases, each benefiting from the framework's comprehensive content verification and aggregation capabilities. Sports media applications can utilize the framework to provide comprehensive athlete coverage that can include posts, stories, and engagement data from all verified social media accounts. In some embodiments, the framework can power fantasy sports applications that can provide real-time updates about player activities, injury status, and team changes based on verified social media content.

News and media organizations can implement the framework to monitor verified accounts of public figures and can receive notifications when significant content is published. In some embodiments, the framework can provide journalists with aggregated feeds of verified content that can inform reporting and can ensure that quotes and information are attributed to authentic accounts. Brand marketing applications can utilize the framework to monitor sponsored content, brand mentions, and influencer partnerships across verified accounts. In some embodiments, the framework can provide brands with comprehensive visibility into how their products and services are discussed by verified influencers and public figures.

Event management applications can leverage the framework during major sporting events, award shows, or industry conferences to aggregate content from verified participants and can provide comprehensive event coverage from authentic sources. In some embodiments, the framework can filter content by event hashtags, location data, and participant lists. In some embodiments, the framework can power mobile applications that can provide users with curated feeds of verified content from their favorite athletes, celebrities, or industry figures. These applications can offer personalized content recommendations based on user preferences and can ensure that users receive authentic content from verified sources.

Social media management platforms can integrate the framework to help agencies and organizations monitor their clients' verified accounts across multiple platforms from a single interface. In some embodiments, the framework can provide comprehensive analytics and engagement metrics that can inform content strategy and can detect potential reputation management issues. The framework can support compliance and monitoring applications that can track verified account activity for regulatory or policy compliance purposes. In some embodiments, the framework can maintain audit trails of all content and can provide reporting capabilities for compliance documentation.

In some embodiments, the framework can implement advanced content modification and delivery mechanisms that can transform aggregated content based on verification status, entity updates, and delivery context requirements. These mechanisms can ensure that content consumers receive appropriately formatted and contextualized information that reflects the most current verification and entity status. In some embodiments, the framework can provide content modification functionality that can apply various transformation rules based on verification confidence levels, entity status changes, and delivery platform requirements. When verification status changes for an entity, the framework can automatically update content attribution, add verification indicators, or modify content presentation to reflect the updated status. In some embodiments, the framework can retroactively apply verification changes to historical content and can maintain audit trails of all modification activities.

According to some embodiments, the framework can implement dynamic content enrichment that can augment social media posts with additional context derived from the metadata enrichment functionality. Such can include adding current team affiliations to athlete posts, inserting professional titles for business figures, or providing career context for entertainment personalities. In some embodiments, the framework can implement real-time enrichment that can update content context as entity information changes. In some embodiments, the delivery mechanism can implement platform-specific formatting that can optimize content presentation for different consumption contexts. Mobile applications can receive compressed image formats and truncated text, while web applications can receive full-resolution media and complete content. In some embodiments, the framework can implement responsive content delivery that can adapt formatting based on device capabilities and network conditions.

In some embodiments, the framework can utilize notification system operations that can leverage the content modification capabilities to provide targeted alerts based on entity changes, verification updates, or significant content events. In some embodiments, the framework can generate push notifications, email alerts, or webhook calls when verified entities publish important content or when verification status changes occur. In some embodiments, the framework can implement intelligent notification filtering that can prevent notification fatigue while ensuring that critical updates are delivered promptly. The content delivery system can implement content personalization that can modify aggregated feeds based on user preferences, consumption history, and engagement patterns. Users can receive customized content streams that prioritize content from preferred entities while maintaining comprehensive coverage of relevant updates.

In some embodiments, the framework can implement comprehensive performance optimization strategies that can ensure consistent response times and system availability even under high load conditions. Such optimization approach can encompass multiple system layers including API request optimization, data processing efficiency, and content delivery acceleration. The API optimization layer can implement intelligent request batching that can combine multiple platform API calls into efficient request sequences.

In some embodiments, the framework can analyze API rate limits across different platforms and can schedule requests to maximize throughput while avoiding rate limiting penalties. In some embodiments, the framework can implement predictive request scheduling that can anticipate content update patterns and can pre-fetch content during low-demand periods.

In some embodiments, the framework can employ data processing optimization that can utilize parallel processing architectures that can distribute content analysis, verification, and aggregation tasks across multiple processing nodes. In some embodiments, the framework can implement work queue systems that can automatically scale processing capacity based on content volume and can maintain consistent processing times regardless of load variations. In some embodiments, the framework can perform content delivery optimization operations that can implement multiple caching layers including in-memory caches for frequently accessed content, database query result caches, and content delivery network integration for media assets. In some embodiments, the framework can implement intelligent cache warming that can pre-populate caches with anticipated content requests and can maintain cache coherency across distributed system components.

Accordingly, the scalability architecture of the disclosed framework can support both vertical and horizontal scaling strategies that can accommodate growth in entity count, content volume, and user demand. Database systems can implement automatic sharding and can distribute data across multiple database instances based on entity distribution and query patterns. In some embodiments, the framework can implement database read replicas that can distribute query load and can ensure consistent read performance. Application server scaling can utilize containerization and orchestration technologies that can automatically provision additional processing capacity during demand spikes and can scale down during low-demand periods.

With reference to FIG. 1, system 100 is depicted which includes user equipment (UE) 102 (e.g., a client device, as mentioned above and discussed below in relation to FIG. 6), network 104, cloud system 106, database 108, and aggregation engine 200. It should be understood that while system 100 is depicted as including such components, it should not be construed as limiting, as one of ordinary skill in the art would readily understand that varying numbers of UEs, peripheral devices, cloud systems, databases, network resources, engines and networks can be utilized; however, for purposes of explanation, system 100 is discussed in relation to the example depiction in FIG. 1.

According to some embodiments, UE 102 can be any type of device, such as, but not limited to, a mobile phone, tablet, laptop, Internet of Things (IoT) device, autonomous machine, and any other device equipped with a cellular or wireless or wired transceiver.

In some embodiments, a peripheral device (not shown) can be connected to UE 102, and can be any type of peripheral device, such as, but not limited to, a wearable device (e.g., smart watch), printer, speaker, and the like. In some embodiments, a peripheral device can be any type of device that is connectable to UE 102 via any type of known or to be known pairing mechanism, including, but not limited to, WiFi, Bluetooth™, Bluetooth Low Energy (BLE), NFC, and the like.

In some embodiments, network 104 can be any type of network, such as, but not limited to, a wireless network, cellular network, the Internet, and the like (as discussed above). Network 104 facilitates connectivity of the components of system 100, as illustrated in FIG. 1.

According to some embodiments, cloud system 106 may be any type of cloud operating platform and/or network based system upon which applications, operations, and/or other forms of network resources may be located. For example, system 106 may be a service provider and/or network provider from where services and/or applications may be accessed, sourced or executed from. For example, system 106 can represent the cloud-based architecture associated with a network platform, which has associated network resources hosted on the internet or private network (e.g., network 104), which enables (via engine 200) the functionality and capabilities discussed herein.

In some embodiments, cloud system 106 may include a server(s) and/or a database of information which is accessible over network 104. In some embodiments, a database 108 of cloud system 106 may store a dataset of data and metadata associated with local and/or network information related to a user(s) of the components of system 100 and/or each of the components of system 100 (e.g., UE, and the services and applications provided by cloud system 106 and/or aggregation engine 200).

In some embodiments, for example, cloud system 106 can provide a private/proprietary management platform, whereby engine 200, discussed infra, corresponds to the novel functionality system 106 enables, hosts and provides to a network 104 and other devices/platforms operating thereon.

Figure 4:
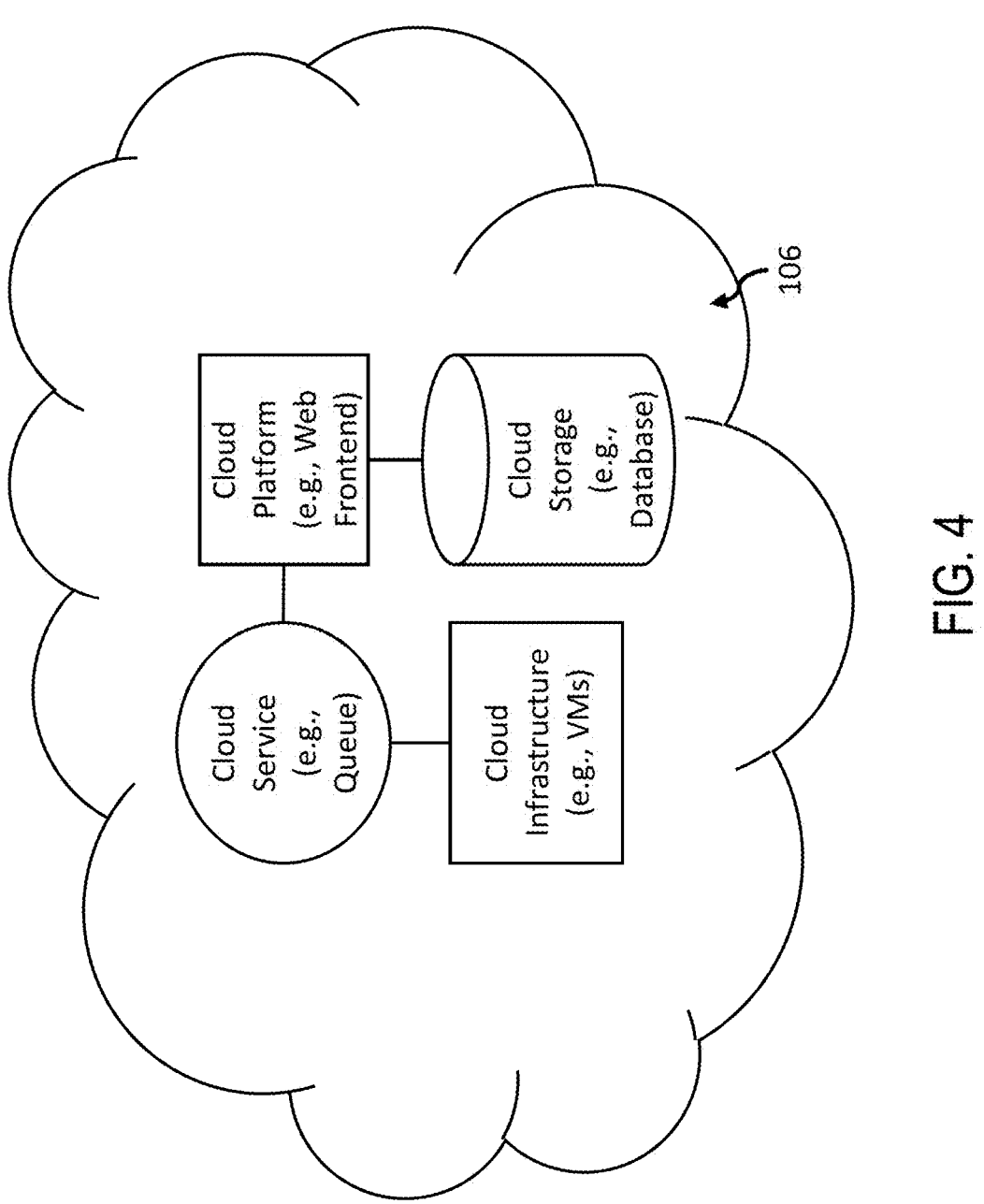
FIG. 4 depicts an exemplary implementation of an architecture according to some embodiments of the present disclosure.
Figure 5:
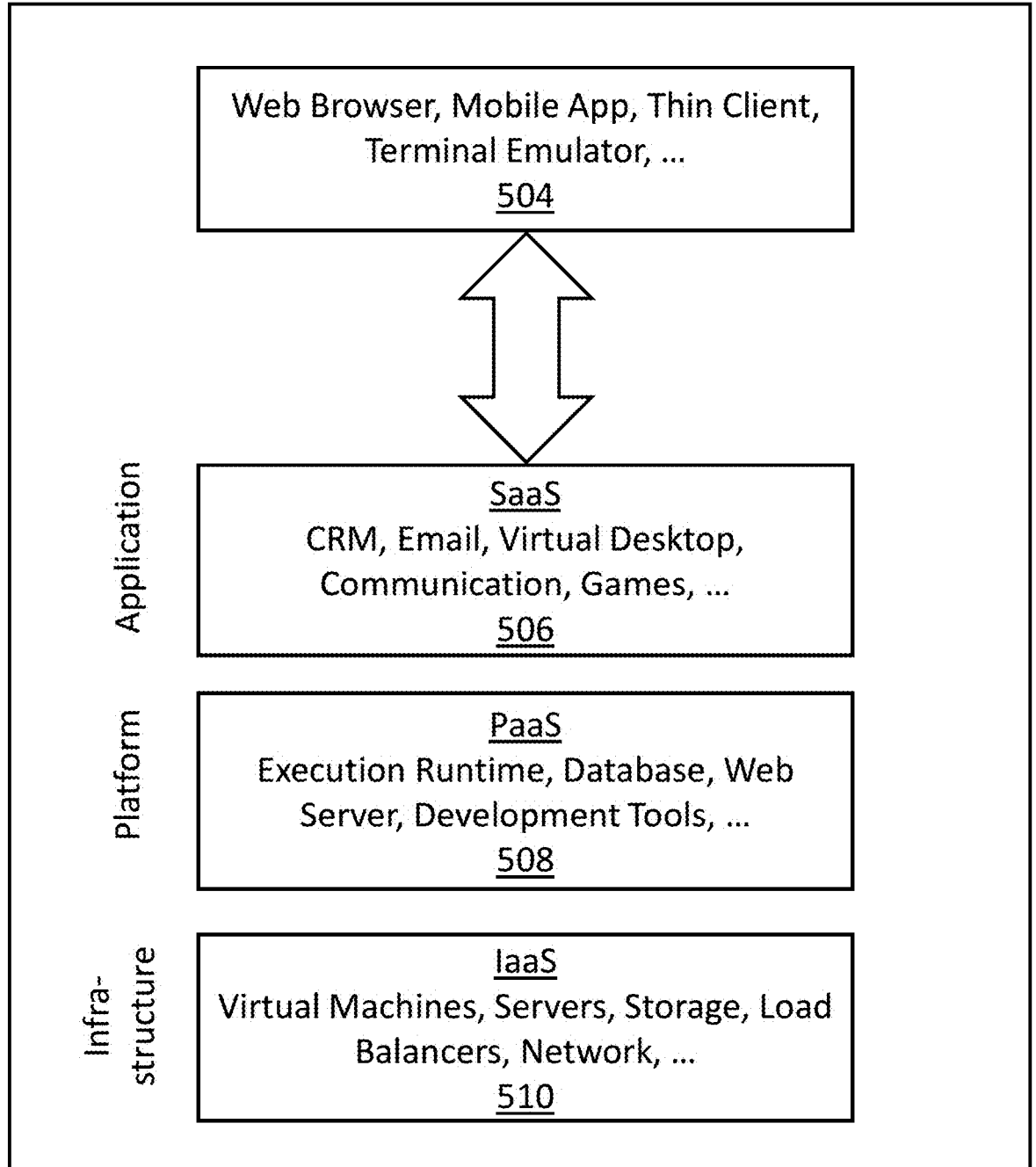
FIG. 5 depicts an exemplary implementation of an architecture according to some embodiments of the present disclosure.

Turning to FIG. 4 and FIG. 5, in some embodiments, the exemplary computer-based systems/platforms, the exemplary computer-based devices, and/or the exemplary computer-based components of the present disclosure may be specifically configured to operate in a cloud computing/architecture 106 such as, but not limiting to: network as a service (NaaS) 510, platform as a service (PaaS) 508, and/or software as a service (SaaS) 506 using a web browser, mobile app, thin client, terminal emulator or other endpoint 504. In some embodiments, as understood by those of skill in the art, an infrastructure as a service (IaaS) can be implemented—for example, as part of and/or in addition to SaaS 506, PaaS 508 and/or NaaS 510. FIG. 4 and FIG. 5 illustrate schematics of non-limiting implementations of the cloud computing/architecture(s) in which the exemplary computer-based systems for administrative customizations and control of network-hosted application program interfaces (APIs) of the present disclosure may be specifically configured to operate.

Turning back to FIG. 1, according to some embodiments, database 108 may correspond to a data storage for a platform (e.g., a network hosted platform, such as cloud system 106, as discussed supra) or a plurality of platforms. Database 108 may receive storage instructions/requests from, for example, engine 200 (and associated microservices), which may be in any type of known or to be known format, such as, for example, standard query language (SQL). According to some embodiments, database 108 may correspond to any type of known or to be known storage, for example, a memory or memory stack of a device, a distributed ledger of a distributed network (e.g., blockchain, for example), a look-up table (LUT), and/or any other type of secure data repository.

According to some embodiments, database 108 may correspond to a distributed ledger of a distributed network. In some embodiments, the distributed network may include a plurality of distributed network nodes, where each distributed network node includes and/or corresponds to a computing device associated with at least one entity (e.g., the entity associated with cloud system 106, for example, discussed supra). In some embodiments, each distributed network node may include at least one distributed network data store configured to store distributed network-based data objects for at least one entity. For example, database 108 may correspond to a blockchain, where the distributed network-based data objects can include, but are not limited to, account information, medical information, entity identifying information, wallet information, device information, network information, credentials, security information, permissions, identifiers, smart contracts, transaction history, and the like, or any other type of known or to be known data/metadata related to an entity's and/or user's information, structure, business and/or legal demographics, inter alia.

Aggregation engine 200, as discussed above and further below in more detail, can include components for the disclosed functionality. According to some embodiments, aggregation engine 200 may be a special purpose machine or processor, and can be hosted by a device on network 104, within cloud system 106, and/or on UE 102. In some embodiments, engine 200 may be hosted by a server and/or set of servers associated with cloud system 106.

According to some embodiments, as discussed in more detail below, aggregation engine 200 may be configured to implement and/or control a plurality of services and/or microservices, where each of the plurality of services/microservices are configured to execute a plurality of workflows associated with performing the disclosed search functionality. Non-limiting embodiments of such workflows are provided below.

According to some embodiments, as discussed above, aggregation engine 200 may function as an application provided by cloud system 106. In some embodiments, engine 200 may function as an application installed on a server(s), network location and/or other type of network resource associated with system 106. In some embodiments, engine 200 may function as an application installed and/or executing on UE 102. In some embodiments, such application may be a web-based application accessed by UE 102 over network 104 from cloud system 106. In some embodiments, engine 200 may be configured and/or installed as an augmenting script, program or application (e.g., a plug-in or extension) to another application or program provided by cloud system 106 and/or executing on UE 102.

Figure 2:
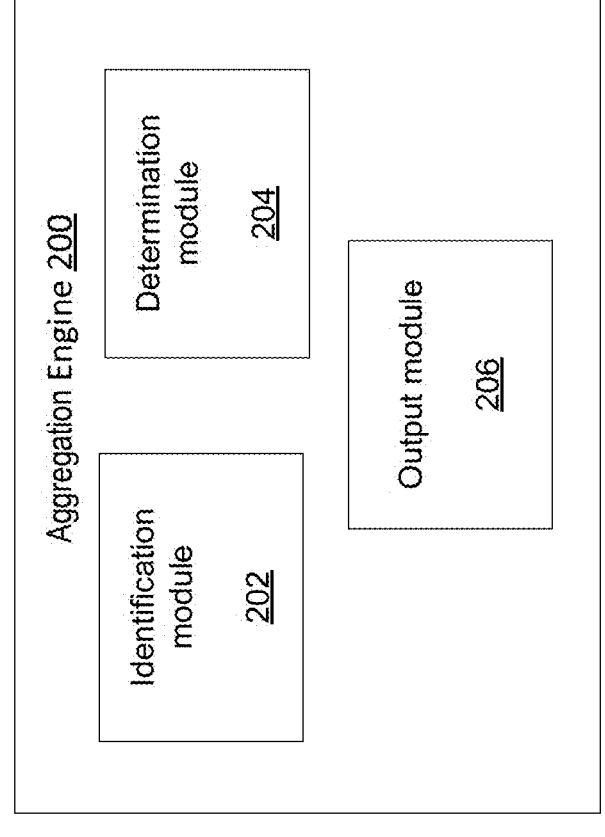
FIG. 2 is a block diagram illustrating components of an exemplary system according to some embodiments of the present disclosure.

As illustrated in FIG. 2, according to some embodiments, aggregation engine 200 includes identification module 202, determination module 204 and output module 206. It should be understood that the engine(s) and modules discussed herein are non-exhaustive, as additional or fewer engines and/or modules (or sub-modules) may be applicable to the embodiments of the systems and methods discussed. More detail of the operations, configurations and functionalities of engine 200 and each of its modules, and their role within embodiments of the present disclosure will be discussed below. Aggregation engine 200 or other device(s) running Process 300 may be operated entirely at the user device level, or with cloud support as a distributed system, or at a service provider's infrastructure, as non-limiting implementation examples. It will be understood that the disclosure herein provides for a configuration that is platform agnostic and may be operated on multiple alternative platforms as a matter of design choice using the teachings described.

Figure 3:
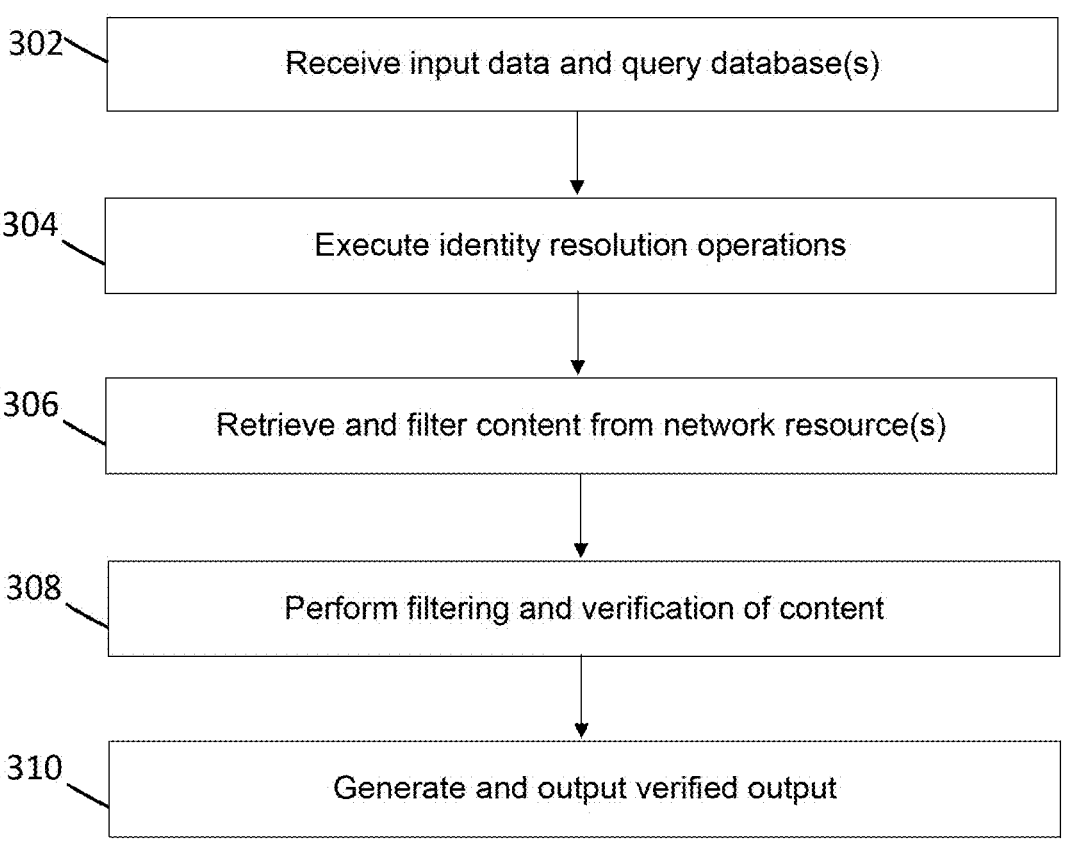
FIG. 3 illustrates an exemplary workflow according to some embodiments of the present disclosure.

In FIG. 3, Processes 300 provides non-limiting example embodiments for automatically and/or dynamically aggregating verified and/or authenticated content from a plurality of disparately located types of network resources. As discussed herein, the framework (e.g., engine 200) can be implemented and/or leveraged for controlling and/or improving the veracity of content shared, posted and/or interacted with online by users, applications, devices, and the like.

According to some embodiments, Step 302 of Process 300 can be performed by identification module 202 of aggregation engine 200; Steps 304-308 determination module 204; and Step 310 can be performed by output module 206.

As mentioned above, it should be understood that while the discussion herein may focus on sports entities, including, but not limited to, athletes, players, coaches, teams, team personnel, and the like, it should not be construed as limiting, as one of skill in the art would readily understand the applicability of the disclosed systems and methods to any other type of information, category and/or content type, which can include, but is not limited to, fashion, news, beauty, technology, and the like, or some combination thereof, for example.

According to some embodiments, Process 300 begins with Step 302 where engine 200 can initiate the sports figure detection and metadata enrichment processing by receiving initial entity input data that can include basic identification markers such as, for example, a sports figure's name, username fragment, team affiliation, partial biographical information, and the like, or some combination thereof. In some embodiments, engine 200 can process such input information (e.g., data/metadata) through its metadata enrichment component, which can systematically expand the limited initial data into comprehensive entity profiles by interfacing with verified league databases, official team rosters, and authoritative sports data providers, including, for example, SportsRadar™, for example. Such mechanisms can parse the input data using natural language processing (NLP) algorithms that can identify, but are not limited to, entity types, extract key identifiers, such as, for example, player names or team affiliations, and normalize naming conventions across different data formats and sources.

In some embodiments, engine 200 can query multiple authoritative sports databases simultaneously to retrieve comprehensive profile information including full legal names, current team affiliations, position data, jersey numbers, career statistics, contract status, and historical team changes that can inform the identity resolution process. In some embodiments, the metadata enrichment process can cross-reference information from official league APIs, team management systems, verified player directories, and third-party sports data aggregators to ensure data accuracy and completeness. In some embodiments, engine 200 can implement conflict resolution algorithms that can reconcile discrepancies between different authoritative sources by applying weighted scoring based on source reliability, data recency, and verification status.

In some embodiments, engine 200's enrichment functionality can extend beyond basic biographical data to compile behavioral metadata including historical social media activity patterns, verified account status across platforms, typical posting frequencies, common hashtag usage patterns, engagement characteristics that can establish baseline signatures for each sports entity, and the like. In some embodiments, engine 200 can analyze career timeline data to identify significant events such as draft dates, trade announcements, injury periods, and retirement status that can influence social media verification decisions. In some embodiments, the metadata compilation process can also incorporate geographic data including team locations, training facilities, and residential areas that can provide additional verification context for location-tagged social media content.

Accordingly, as discussed herein, the enrichment functionality can involve creating a data item, file, data structure, and the like, that captures the metadata retrieved, identified or created during the enrichment process, as well as the retrieved profile information. In some embodiments, such enrichment can involve modifying the retrieved information, with annotations, formatting, alterations to data/metadata types, and the like.

In some embodiments, engine 200 can maintain dynamic confidence scoring throughout the metadata enrichment process, where each data element can be weighted based on its source authority, verification status, and temporal relevance. In some embodiments, the enriched metadata profile can be structured into standardized schemas that can support downstream processing by the identity resolution and content aggregation components while preserving the original source attributions and confidence metrics for audit and verification purposes.

In Step 304, engine 200 can execute advanced identity resolution algorithms that can process the enriched metadata to determine definitive associations between sports entities and their social media accounts across multiple platforms. In some embodiments, engine 200 can apply name-matching logic as specified in the modular architecture, implementing fuzzy string matching algorithms that can account for variations in name presentation, including nickname usage, abbreviated forms, married name changes, and international character representations that are common in professional sports contexts.

In some embodiments, engine 200 can execute multi-factor verification strategies that can evaluate potential account matches based on multiple verification signals including platform verification badges, account creation dates that align with career timelines, follower patterns that reflect professional sports networks, engagement metrics consistent with public figure status, and content themes that align with sports career activities. In some embodiments, the identity resolution process can analyze historical pattern recognition data to validate platform handles by comparing posting behaviors, content themes, and engagement patterns against established baselines for verified sports figures.

In some embodiments, the resolution algorithms can implement probabilistic matching capabilities through machine learning modules that can continuously improve accuracy through feedback loops and pattern recognition refinement. In some embodiments, engine 200 can analyze successful and failed identity matches to refine its scoring algorithms and can adapt to evolving social media usage patterns specific to professional sports figures. In some embodiments, the machine learning components can identify behavioral signatures that can distinguish authentic sports figure accounts from fan accounts, parody accounts, or impersonation attempts by analyzing posting frequency patterns, content sophistication levels, insider knowledge demonstration, and professional network connections.

In some embodiments, engine 200 can function to process complex identity scenarios specific to sports environments, including name changes due to marriage, international player name variations, players who change teams frequently, retired players maintaining social media presence, and players who maintain multiple accounts for different purposes. In some embodiments, engine 200 can maintain historical identity mapping that can track entity evolution over time while preserving content associations even when underlying profile information changes due to trades, retirements, or personal circumstances.

In some embodiments, such resolution process can implement cross-platform validation where accounts identified on one platform can be used to inform and verify accounts on other platforms through network analysis, cross-posting pattern recognition, and mutual connection analysis with other verified sports figures, teams, and sports media personalities. In some embodiments, engine 200 can apply team affiliation consistency checks that can verify whether claimed team associations align with official roster data, contract status, and recent transaction history retrieved during the metadata enrichment phase.

In Step 306, engine 200 can execute and/or deploy platform-specific modules that can interface with diverse social media APIs to retrieve and filter content from, for example, Twitter, Instagram, Facebook, TikTok, and Snapchat while accommodating each platform's unique technical requirements and data structures. Thus, such network resources can be of any type and/or any source, which can provide social information for purposes of this disclosure. Each social media module can implement platform-specific authentication protocols, with the Twitter module managing OAuth 2.0 authentication and interfacing with Twitter API v2 endpoints to retrieve tweets, retweets, quoted tweets, and engagement metrics while handling Twitter's rate limiting requirements through intelligent request queuing and retry logic.

For example, an Instagram module can manage Instagram Graph API authentication requirements and can retrieve posts, stories, reels, and/or other types of content/streams, for example, while processing Instagram-specific metadata including image recognition data, hashtag analysis, and story highlight collections. In some embodiments, engine 200 can handle Instagram's business account API requirements and can maintain appropriate data usage compliance while extracting visual content metadata that can provide additional verification signals for sports figure accounts.

In some embodiments, engine 200 can implement a Facebook module that can interface with Facebook's Graph API to access page posts, personal posts where permitted, and engagement data while maintaining compliance with Facebook's evolving data access policies and permission models. For example, the Facebook module can handle token refresh cycles automatically and can manage the platform's complex privacy settings that can affect content visibility and retrieval capabilities.

In some embodiments, for example, a TikTok module can implement TikTok's API authentication protocols and can retrieve video content, hashtag participation data, trend engagement metrics, and viral content indicators while processing TikTok-specific elements such as video effects usage, music attribution, and challenge participation that can provide behavioral verification signals for sports figures engaging with trending content.

In some embodiments, engine 200 can deploy a Snapchat module that can interface with available Snapchat APIs to retrieve story content, public snap data, and profile information while accommodating Snapchat's ephemeral content model through time-sensitive content capture mechanisms that can preserve content within appropriate visibility windows.

Accordingly, it should be understood that engine 200 can deploy platform specific modules (e.g., a module for Snapchat, a module for TikTok, for example), and/or can deploy modules for types of platforms (e.g., modules for Instagram, TikTok, Twitter, for example; and modules for Facebook, for example).

In some embodiments, each platform module of engine 200 can implement robust error handling, automatic retry mechanisms, and failover protocols that can ensure continuous operation even when individual platforms experience API outages, rate limiting, or policy changes. In some embodiments, engine 200 can maintain platform health monitoring that can detect service disruptions and can implement alternative data retrieval strategies or temporary content caching to maintain service continuity during platform downtime.

In some embodiments, such platform modules can function to normalize response data into unified content schemas as specified in the modular architecture, ensuring that posts, images, videos, engagement metrics, and metadata can be consistently processed regardless of their origin platform. In some embodiments, engine 200 can implement content standardization algorithms that can translate platform-specific data elements into common formats while preserving platform-unique characteristics that can provide valuable verification and analysis insights.

In Step 308, engine 200 can execute content filtering and verification processes that can ensure only authentic content from verified sports figures can proceed to the output stage. In some embodiments, engine 200 can apply multiple verification layers including account-level authentication that can leverage platform verification badges, cross-platform verification consistency, and behavioral pattern analysis that can compare retrieved content against established baselines for verified sports entities.

In some embodiments, engine 200 can implement content authenticity analysis that can examine individual posts for verification markers including original content indicators, timestamp consistency with known sports figure activity patterns, engagement ratios consistent with public figure status, and content themes that align with professional sports contexts. In some embodiments, the filtering process can detect artificially inflated engagement, bot interactions, and suspicious posting patterns that might indicate compromised accounts or coordinated inauthentic behavior.

In some embodiments, executed verification algorithms can analyze content consistency across platforms to identify cross-posting patterns, similar content themes, and coordinated messaging that can provide additional authenticity signals for sports figure accounts. In some embodiments, engine 200 can implement temporal analysis that can verify whether posting patterns align with known sports schedules, game times, travel itineraries, and training schedules that can provide context-specific verification for sports content.

In some embodiments, engine 200 can apply sports-specific content filtering that can prioritize content related to games, training, team activities, endorsements, and personal updates while filtering out content that may be inconsistent with verified sports figure behavior patterns. In some embodiments, the engine 200 can implement keyword analysis, hashtag validation, and mention pattern recognition that can identify content most relevant to sports figure social media presence.

In some embodiments, the content verification process can incorporate real-time validation that can check current team affiliations, active roster status, and recent transaction history to ensure that content attribution remains accurate even as sports figures change teams, retire, or modify their professional status. In some embodiments, engine 200 can implement automated flagging mechanisms that can identify content that requires additional verification when significant deviations from established patterns are detected.

In some embodiments, engine 200 can maintain verification confidence scoring throughout the filtering process, where each piece of content can be assigned reliability metrics based on source verification, content consistency, behavioral alignment, and cross-platform validation results. Content that fails to meet configurable verification thresholds can be quarantined for manual review or excluded from output feeds to maintain output quality and authenticity standards.

In Step 310, engine 200 can generate verified output feeds that can deliver (only) posts confirmed/verified to originate from resolved sports entities, implementing comprehensive quality assurance protocols that can ensure output accuracy and reliability. In some embodiments, engine 200 can compile verified content from all platform modules into unified output streams that can maintain temporal ordering, preserve platform-specific engagement data, and include verification metadata that can inform downstream applications about content authenticity and confidence levels.

In some embodiments, engine 200 can implement output formatting that can adapt content presentation based on consumption requirements, with mobile applications receiving optimized image formats and truncated text while web applications can access full-resolution media and complete content. In some embodiments, the output generation process can include dynamic content enrichment that can augment social media posts with contextual information derived from the metadata enrichment phase, including current team affiliations, recent performance statistics, or career milestone context. Thus, in some embodiments, the output content can be formatted, modified and/or generated to fit to a receiving device, rendering application/API, viewing user, and the like, or some combination thereof.

In some embodiments, the verified output system can implement real-time delivery mechanisms that can push new verified content to subscribed applications and services immediately upon verification completion. In some embodiments, engine 200 can maintain webhook delivery systems that can notify external applications when new verified content becomes available, implementing delivery guarantees and retry logic to ensure reliable content distribution.

In some embodiments, engine 200 can generate multiple output formats including JSON APIs for programmatic access, RSS feeds for content syndication, and formatted HTML streams for direct web integration. In some embodiments, the output functionality of engine 200 can support filtering and customization options that can allow consuming applications to specify content types, date ranges, engagement thresholds, and specific sports figures or teams of interest.

In some embodiments, the output processing of engine 200 can implement output analytics that can track content delivery metrics, engagement patterns, and verification accuracy rates to support system optimization and quality monitoring. In some embodiments, engine 200 can maintain audit trails that can document the complete verification process for each piece of content, including source platform, verification steps completed, confidence scores achieved, and any manual review actions taken.

In some embodiments, engine 200 can support batch output generation for historical content analysis and bulk data export while maintaining real-time output capabilities for live content streaming. In some embodiments, such output functionality can involve and/or execute content archiving that can preserve verified content for specified retention periods while maintaining searchability and accessibility for historical analysis purposes.

In some embodiments, the verified output feeds can include metadata that can inform consuming applications about content verification status, source platform diversity, content freshness, and any limitations or caveats associated with specific content items. In some embodiments, engine 200 can implement output quality monitoring that can track verification accuracy rates and can automatically adjust verification parameters to maintain target quality levels while optimizing processing efficiency and content coverage.

According to some embodiments, the computational analysis performed in the steps of Process 300, inter alia, discussed supra, can involve engine 200 calling and executing an AI and/or ML model and/or a large language model (LLM). Accordingly, in some embodiments, the AI/ML models can be any type of known or to be known, specifically trained AI/ML model, particular machine learning model architecture, particular machine learning model type (e.g., convolutional neural network (CNN), recurrent neural network (RNN), autoencoder, support vector machine (SVM), and the like), or any other suitable definition of an AI/ML model or any suitable combination thereof.

In some embodiments, an LLM can be leveraged, as discussed herein, whether known or to be known. As discussed above, an LLM is a type of AI system designed to understand and generate human-like text based on the input it receives. The LLM can implement technology that involves deep learning, training data and NLP. Large language models are built using deep learning techniques, specifically using a type of neural network called a transformer. These networks have many layers and millions or even billions of parameters. LLMs can be trained on vast amounts of text data from the internet, books, articles, and other sources to learn grammar, facts, and reasoning abilities. The training data helps them understand context and language patterns. LLMs can use NLP techniques to process and understand text. Such includes tasks like tokenization, part-of-speech tagging, and named entity recognition.

LLMs can include functionality related to, but not limited to, text generation, language translation, text summarization, question answering, conversational AI, text classification, language understanding, content generation, and the like. Accordingly, LLMs can generate, comprehend, analyze and output human-like outputs (e.g., text, speech, audio, video, and the like) based on a given input, prompt or context. Accordingly, LLMs, which can be characterized as transformer-based LLMs, involve deep learning architectures that utilizes self-attention mechanisms and massive-scale pre-training on input data to achieve NLP understanding and generation. Such current and to-be-developed models can aid AI systems in handling human language and human interactions therefrom.

In some embodiments, such model can be configured to identify and utilize one or more AI/ML techniques selected from, but not limited to, computer vision, feature vector analysis, decision trees, boosting, support-vector machines, neural networks, nearest neighbor algorithms, Naive Bayes, bagging, random forests, logistic regression, and the like.

In some embodiments and, optionally, in combination of any embodiment described above or below, a neural network technique can be one of, without limitation, feedforward neural network, radial basis function network, recurrent neural network, convolutional network (e.g., U-net) or other suitable network. In some embodiments and, optionally, in combination with any embodiment described above or below, an implementation of the Neural Network can be executed as follows:

a. define Neural Network architecture/model, b. transfer the input data to the neural network model, c. train the model incrementally, d. determine the accuracy for a specific number of timesteps, e. apply the trained model to process the newly received input data, f. optionally and in parallel, continue to train the trained model with a predetermined periodicity.

In some embodiments and, optionally, in combination of any embodiment described above or below, the trained neural network model can specify a neural network by at least a neural network topology, a series of activation functions, and connection weights. For example, the topology of a neural network can include a configuration of nodes of the neural network and connections between such nodes. In some embodiments and, optionally, in combination of any embodiment described above or below, the trained neural network model can also be specified to include other parameters, including but not limited to, bias values/functions and/or aggregation functions. For example, an activation function of a node can be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the aggregation function can be a mathematical function that combines (e.g., sum, product, and the like) input signals to the node. In some embodiments and, optionally, in combination of any embodiment described above or below, an output of the aggregation function can be used as input to the activation function. In some embodiments and, optionally, in combination of any embodiment described above or below, the bias can be a constant value or function that can be used by the aggregation function and/or the activation function to make the node more or less likely to be activated.

Figure 6:
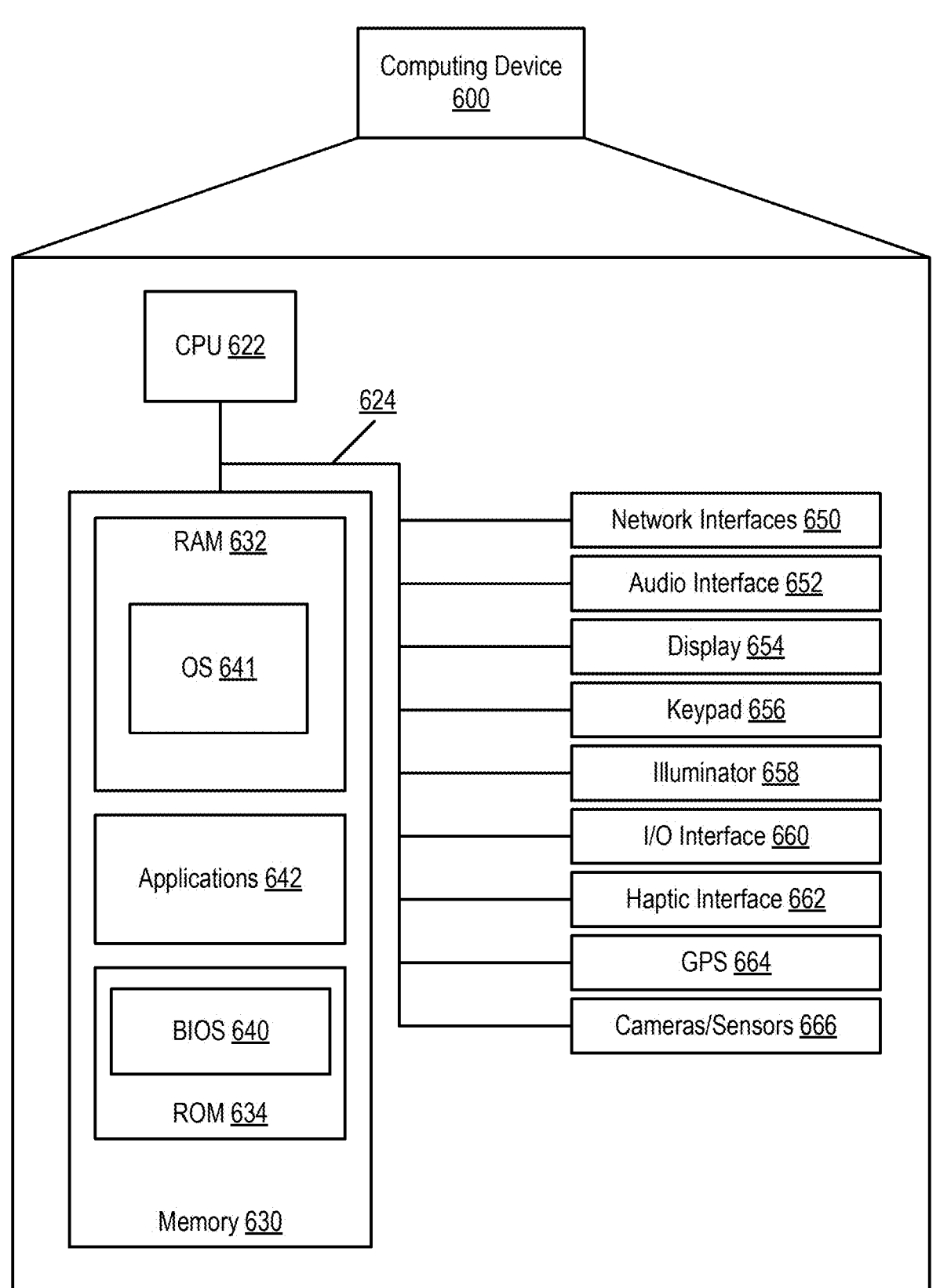
FIG. 6 is a block diagram illustrating a computing device showing an example of a client or server device used in various embodiments of the present disclosure.

FIG. 6 is a schematic diagram illustrating a client device showing an example embodiment of a client device that may be used within the present disclosure. Client device 600 may include many more or less components than those shown in FIG. 6. However, the components shown are sufficient to disclose an illustrative embodiment for implementing the present disclosure. Client device 600 may represent, for example, UE 102 discussed above at least in relation to FIG. 1.

As shown in the figure, in some embodiments, Client device 600 includes a processing unit (CPU) 622 in communication with a mass memory 630 via a bus 624. Client device 600 also includes a power supply 626, one or more network interfaces 650, an audio interface 652, a display 654, a keypad 656, an illuminator 658, an input/output interface 660, a haptic interface 662, an optional global positioning systems (GPS) receiver 664 and a camera(s) or other optical, thermal or electromagnetic sensors 666. Device 600 can include one camera/sensor 666, or a plurality of cameras/sensors 666, as understood by those of skill in the art. Power supply 626 provides power to Client device 600.

Client device 600 may optionally communicate with a base station (not shown), or directly with another computing device. In some embodiments, network interface 650 is sometimes known as a transceiver, transceiving device, or network interface card (NIC).

Audio interface 652 is arranged to produce and receive audio signals such as the sound of a human voice in some embodiments. Display 654 may be a liquid crystal display (LCD), gas plasma, light emitting diode (LED), or any other type of display used with a computing device. Display 654 may also include a touch sensitive screen arranged to receive input from an object such as a stylus or a digit from a human hand.

Keypad 656 may include any input device arranged to receive input from a user. Illuminator 658 may provide a status indication and/or provide light.

Client device 600 also includes input/output interface 660 for communicating with external. Input/output interface 660 can utilize one or more communication technologies, such as USB, infrared, Bluetooth™, or the like in some embodiments. Haptic interface 662 is arranged to provide tactile feedback to a user of the client device.

Optional GPS transceiver 664 can determine the physical coordinates of Client device 600 on the surface of the Earth, which typically outputs a location as latitude and longitude values. GPS transceiver 664 can also employ other geopositioning mechanisms, including, but not limited to, tri-angulation, assisted GPS (AGPS), E-OTD, CI, SAI, ETA, BSS or the like, to further determine the physical location of client device 600 on the surface of the Earth. In one embodiment, however, Client device 600 may through other components, provide other information that may be employed to determine a physical location of the device, including for example, a MAC address, Internet Protocol (IP) address, or the like.

Mass memory 630 includes a RAM 632, a ROM 634, and other storage means. Mass memory 630 illustrates another example of computer storage media for storage of information such as computer readable instructions, data structures, program modules or other data. Mass memory 630 stores a basic input/output system ("BIOS") 640 for controlling low-level operation of Client device 600. The mass memory also stores an operating system 641 for controlling the operation of Client device 600.

Memory 630 further includes one or more data stores, which can be utilized by Client device 600 to store, among other things, applications 642 and/or other information or data. For example, data stores may be employed to store information that describes various capabilities of Client device 600. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 600.

Applications 642 may include computer executable instructions which, when executed by Client device 600, transmit, receive, and/or otherwise process audio, video, images, and enable telecommunication with a server and/or another user of another client device. Applications 642 may further include a client that is configured to send, to receive, and/or to otherwise process gaming, goods/services and/or other forms of data, messages and content hosted and provided by the platform associated with engine 200 and its affiliates.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, and the like).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, API, instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, and the like).

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data. Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
   receiving, by an application, from a user device, entity input data comprising at least one identifier associated with an entity;
   querying, by the application, a plurality of databases based on the entity input data;
   enriching, by the application, the entity input data with verified metadata, the verified metadata being metadata retrieved via the querying, the verified metadata indicating a correct identity match for the entity, the enrichment comprising modifying the entity input data with the verified metadata to indicate such the correct identity match;

executing, by the application, identity resolution algorithms using the verified metadata to associate the entity with one or more social media accounts across multiple platforms;
   retrieving, by the application, social media content from the one or more social media accounts through platform-specific functionality executed via the application;
   filtering, by the application, the retrieved social media content using verification algorithms that apply multi-factor analysis including at least one of account-level verification signals, behavioral consistency, or cross-platform validation;
   generating, by the application, an output feed comprising only verified social media content associated with the entity, the output feed comprising electronic information renderable by a receiving device; and
   communicating, by the application, to the user device, the output feed in response to receiving the entity input data.

2. The method of claim 1, wherein enriching the entity input data comprises applying conflict resolution information based on weighted scoring of source reliability.

3. The method of claim 1, wherein the identity resolution algorithms comprise fuzzy string matching to account for name variations, nicknames, and international character sets.

4. The method of claim 1, wherein the multi-factor analysis comprises evaluating verification badges, follower network patterns, and content themes consistent with entity activity.

5. The method of claim 1, wherein the platform-specific functionality normalizes response data into a unified schema to enable standardized processing across diverse social media platforms.

6. The method of claim 1, wherein filtering the retrieved content further comprises detecting inauthentic activity including at least one of bot interactions, artificially inflated engagement, or suspicious posting patterns.

7. The method of claim 1, further comprising applying temporal analysis to verify that posting patterns correspond to known event schedules, timelines, or geographic indicators associated with the entity.

8. The method of claim 1, wherein generating the output feed comprises structuring verified content into formats associated with capabilities of a receiving device.

9. The method of claim 1, further comprising maintaining verification confidence scores for each content item and excluding content that is below a predetermined verification threshold.

10. The method of claim 1, wherein generating the output feed further comprises enriching verified content with contextual metadata including at least one of affiliation data, performance statistics, or career milestones.

11. A non-transitory computer-readable storage medium tangibly encoded with computer-executable instructions that when executed by a processor, perform a method comprising:
   receiving, by an application, from a user device, entity input data comprising at least one identifier associated with an entity;
   querying, by the application, a plurality of databases based on the entity input data;
   enriching, by the application, the entity input data with verified metadata, the verified metadata being metadata retrieved via the querying, the verified metadata indicating a correct identity match for the entity, the enrichment comprising modifying the entity input data with the verified metadata to indicate such the correct identity match;

executing, by the application, identity resolution algorithms using the verified metadata to associate the entity with one or more social media accounts across multiple platforms;

retrieving, by the application, social media content from the one or more social media accounts through platform-specific functionality executed via the application;

filtering, by the application, the retrieved social media content using verification algorithms that apply multi-factor analysis including at least one of account-level verification signals, behavioral consistency, or cross-platform validation;

generating, by the application, an output feed comprising only verified social media content associated with the entity, the output feed comprising electronic information renderable by a receiving device; and communicating, by the application, to the user device, the output feed in response to receiving the entity input data.

12. The non-transitory computer-readable storage medium of claim 11, wherein enriching the entity input data comprises applying conflict resolution information based on weighted scoring of source reliability.

13. The non-transitory computer-readable storage medium of claim 11, wherein the platform-specific functionality normalizes response data into a unified schema to enable standardized processing across diverse social media platforms.

14. The non-transitory computer-readable storage medium of claim 11, wherein filtering the retrieved content further comprises detecting inauthentic activity including at least one of bot interactions, artificially inflated engagement, or suspicious posting patterns.

15. The non-transitory computer-readable storage medium of claim 11, further comprising applying temporal analysis to verify that posting patterns correspond to known event schedules, timelines, or geographic indicators associated with the entity.

16. The non-transitory computer-readable storage medium of claim 11, wherein generating the output feed comprises structuring verified content into formats associated with capabilities of a receiving device.

17. The non-transitory computer-readable storage medium of claim 11, further comprising maintaining verification confidence scores for each content item and excluding content that is below a predetermined verification threshold.

18. The non-transitory computer-readable storage medium of claim 11, wherein generating the output feed further comprises enriching verified content with contextual metadata including at least one of affiliation data, performance statistics, or career milestones.

19. A system comprising:

a processor configured to:

receive, by an application, from a user device, entity input data comprising at least one identifier associated with an entity;

query, by the application, a plurality of databases based on the entity input data;

enrich, by the application, the entity input data with verified metadata, the verified metadata being metadata retrieved via the querying, the verified metadata indicating a correct identity match for the entity, the enrichment comprising modifying the entity input data with the verified metadata to indicate such the correct identity match;

execute, by the application, identity resolution algorithms using the verified metadata to associate the entity with one or more social media accounts across multiple platforms;

retrieve, by the application, social media content from the one or more social media accounts through platform-specific functionality executed via the application;

filter, by the application, the retrieved social media content using verification algorithms that apply multi-factor analysis including at least one of account-level verification signals, behavioral consistency, or cross-platform validation;

generate, by the application, an output feed comprising only verified social media content associated with the entity, the output feed comprising electronic information renderable by a receiving device; and communicate, by the application, to the user device, the output feed in response to receiving the entity input data.

20. The system of claim 19, wherein enriching the entity input data comprises applying conflict resolution information based on weighted scoring of source reliability.

* * * * *